Patented Apr. 10, 1945

2,373,548

UNITED STATES PATENT OFFICE 2,373,548

PROCESS OF REMOVING CATIONS FROM LIQUID MEDIA

Gaetano F. D'Alelio, Pittsfield, Mass., assignor to General Electric Company, a corporation of New York No Drawing. Application October 15, 1942, Serial No. 462,208

14 Claims. (Cl. 210—24)

The present invention relates to a process of removing cations from liquid media, such as aqueous media, by contacting the liquid media with a mass comprising a substantially insoluble phenolic resin modified to have a high cation capacity.

Many natural and synthetic compositions have been proposed for removing cations from solutions. Such materials to be useful must possess the following properties:

1. They must contain either a chemical group which will react with the cation or have an activated surface which physically adsorbs the cation.
2. They must be capable of regeneration to at least part of their original activity so that they may be reused.
3. They must be insoluble in the liquid media before and after removing cations from the media. Thus, if an acid were used as the treating agent it would have to be insoluble both as the acid and as the salt since the acid is the form before adsorbing cations and the salt is the form after adsorbing cations.

It is known that resins prepared from polyhydric phenols and aldehydes exhibit cation exchange properties. However, the cation exchange capacities of the most common phenolic resins, i. e., those prepared from a monohydric phenol and an aldehyde, have, in general, been too low to warrant their use in industry.

I have now discovered that by suitable modification of phenol-aldehyde resins, i. e., resins prepared from a monohydric phenol and an aldehyde, resinous ion-exchange bodies may be prepared which exhibit pronounced ion exchange properties. More specifically, I have discovered that cations may be removed from liquid media by contacting such media with phenol-aldehyde resins containing a co-condensed (inter-condensed) semi-amide of a polycarboxylic acid, i. e. a partial amide of a polycarboxylic acid containing at least one —COOH radical and at least one —CONH$_2$ radical.

Any suitable method may be used in preparing the insoluble infusible resins produced in my invention. For example, the semi-amide of a polycarboxylic acid may be reacted with pre-condensed liquid phenol-aldehyde resins and the resulting mass cured to a hard infusible resin or, alternatively, a phenol, an aldehyde, and a semi-amide may be mixed, heat-reacted, and cured to a hard, infusible state. The reactions may be carried out in the presence or absence of the solvents or a dispersion medium for the components at atmospheric, subatmospheric, or superatmospheric pressure. The reaction may be effected under the acid, alkaline, or neutral conditions. Examples of phenols which may be used in the preparation of such ion-exchange bodies are the trifunctional phenols, i. e., phenols having three aldehyde-reactable positions such as phenol, meta-substituted phenols including meta-cresol, meta - ethyl phenol, meta - nitrophenol, meta-chlorophenol, etc. or meta-disubstituted xylenols such as the 3,5-dimethyl phenol, 3-methyl-5-ethyl phenol, 3 chloro-5-nitro phenol, difunctional phenols, i. e. phenols having two aldehyde-reactable positions such as o- and p-cresol, o-chlorophenol, may be incorporated with sufficient unsubstituted or meta-substituted phenol to cause the resin to cure completely, or may be used with aldehydes, such as acrolein, glyoxal, etc., which will form resins which are heat-curable after the initial condensation.

Various aldehydes such as formaldehyde, acetaldehyde, propionaldehyde, butyraldehyde, acrolein, crotonaldehyde, benzaldehyde, naphthaldehyde, glyoxal, as well as halogen-substituted aldehydes such as chloroacetaldehyde, etc., or compounds engendering aldehydes, e. g., paraform, hexamethylenetetramine, paraldehyde, etc., may be used. The majority of these aldehydes may be used alone but are preferably used in conjunction with formaldehyde. Formaldehyde is the preferred aldehyde.

The semi-amides (partial amides) of polycarboxylic acids which may be used are: oxamic acid, maleamic acid, phthalamic acid, succinamic acid, adipic monoamide, itaconic monoamide, citric monoamide, citric diamide, tricarballylic monoamide, tricarballylic diamide, naphthalic monoamide, and the partial amides of polyacrylic and polymethacrylic acids, etc.

Certain of these resins are more fully described in my Patent 2,260,006, issued October 21, 1941.

After condensation of the reaction components is complete the product is isolated, if a solvent or dispersion medium was used, and is thereafter heat-hardened and the heat-hardened product ground to a granular form. All factors being equal, the finer the granular form or the more surface is exposed the more effective the resin is in removing the cations from the solution.

When the liquid media having various cation impurities dissolved therein are brought in contact with these insoluble, infusible resins containing carboxyl groups, the cations, e. g., sodium ions, calcium ions, lead ions, magnesium ions, iron ions, etc., react with the carboxyl groups to form salts which are also insoluble and infusible. The cations are, therefore, effectively removed from solution.

After the resin has adsorbed the cations it can readily be regenerated, for example by washing with a dilute acid, preferably a mineral acid which forms soluble salts with the adsorbed cations.

In order that those skilled in the art better may understand how the present invention is carried into effect, the following illustrative examples are given, all parts being by weight.

*Example 1*

| No. | Composition | | Efficiency |
|---|---|---|---|
| | Liquid resin | Semi-amide and amount | |
| | | | Per cent |
| A | 60 | Phthalamic, 20 | 8 |
| B | 60 | Phthalamic, 50 | 7 |
| C | 60 | Maleamic, 10 | 8 |
| D | 60 | Maleamic, 26 | 8 |
| E | 60 | Oxamic, 10 | 11 |
| F | 60 | Oxamic, 21 | 17 |

The liquid resin used in the above preparations was a liquid phenol-aldehyde varnish obtained by refluxing 1 mol phenol, 2 mols formaldehyde, and 0.75 per cent KOH, based on the weight of the phenol for between 2 and 2½ hours and dehydrating the product under reduced pressure to a solids content of 80 per cent. The slightly yellow, liquid resin and the designated semi-amides were well mixed in the indicated proportions, placed in a steam bath from 15 to 30 minutes and thereafter cured to an infusible state by heating for 16 hours at 120–130° C. The hardened resins were then ground to pass a 20-mesh screen and tested for their ability to remove cations from solution by allowing a weighed sample of each resin to remain in contact with a standard sodium hydroxide solution for five minutes, filtering and titrating the filtrate with standard acid to determine how much the alkalinity of the water had been decreased by the adsorption of the sodium ions. The efficiency was measured by calculating the ratio of sodium ions actually removed to the sodium ions theoretically removable if each of the carboxyl groups present in the resin had removed a sodium ion. The efficiencies of these resins are given in the last column of the above table. The resins are stable and maintain their exchange capacities throughout a number of adsorption and regeneration cycles. Due to the fact that portions of the original resins are soluble in water, a slight decrease in the exchange capacity of the resins may be noted after the original regeneration. For example, resin B, after regeneration with a solution of hydrochloric acid had an exchange capacity equal to 82 per cent of its capacity prior to regeneration. In general, the resins are only slightly soluble in caustic solutions and in hot water.

If desired, the semi-amide may be added to the liquid resin prior to the dehydration so that it is intercondensed simultaneously with the dehydration. The other operations are carried out as described above.

*Example 2*

This example illustrates an alternative procedure for the preparation of these cation exchange resins.

| | Phenol | Aldehyde | Semi-amide | Efficiency |
|---|---|---|---|---|
| | Grams | | | Per cent |
| A | 47 | $CH_2O$ (37%), 80 g | Phthalamic, 45 g | 7 |
| B | 47 | $CH_2O$ (37%), 40 g; Furfural, 48 g | Maleamic, 25 g | 20 |
| C | 47 | Acrolein, 56 g | Oxamic, 30 g | 48 |

The phenols, the designated aldehydes and semi-amides were mixed well at room temperature and allowed to stand over night. The mixtures were then heated on a steam bath at 100° C. for 15 to 30 minutes and thereafter cured at 120 to 130° C. for 16 hours. The efficiencies of these resins were measured following the procedure set forth under Example 1. The results are tabulated in the last column of the table.

For best results it is desirable that the ion-exchange resin contain at least one-fourth mol semi-amide for each mol phenol. The maximum proportion of semi-amide depends on the heat-hardenability and solubility of the products. I have successfully used as much as 0.8 mol semi-amide per mol phenol. Ordinarily I use at least 1.1 mols, preferably 1.5 mols, aldehyde for each mol phenol and for each mol of semi-amide.

The ion exchange resins prepared in accordance with my invention may be used in all manners known at present involving ion exchange reactions. The resins are particularly useful in the purification of water. The resins in granular form may be used as such or, if desired, an inert material such as diatomaceous earth (e. g., fuller's earth, including spent fuller's earth, from petroleum refining processes), alundum, coke, silica, cinders, porous glass, etc., may be used as a carrier for the resins to increase the effective surface of the latter. This may be done by adding such carriers to the resin or a solution thereof at any time prior to the complete condensation of the resin to the infusible, insoluble state followed by complete curing of the resin. In this way the carrier is surface-coated with the resin. Alternatively, an emulsion or dispersion of the resin may be used for coating the carrier materials, thus eliminating the necessity of grinding the mass before use since the product will be obtained in a finely divided state.

What I claim as new and desire to secure by Letters Patent of the United States is:

1. The method of treating liquid media to remove cations therefrom which comprises contacting such media with a mass comprising an infusible, resinous cation-exchange body which is the reaction product of a phenol, an aldehyde, and a partial amide of a polycarboxylic acid containing at least one —COOH radical and at least one —CONH₂ radical.

2. The method of removing cations from aqueous media which comprises contacting said media with a mass comprising an infusible, resinous cation exchange body which is the reaction product of phenol, formaldehyde, and a partial amide of a polycarboxylic acid containing at least one —COOH radical and at least one —CONH₂ radical.

3. The method as in claim 2 wherein the partial amide is maleamic acid.

4. The method as in claim 2 wherein the partial amide is oxamic acid.

5. The method as in claim 2 wherein the partial amide is phthalamic acid.

6. The method of treating aqueous media to remove cations therefrom which comprises percolating such media through a resinous cation-exchange body which is a dehydrated, infusible reaction product of a liquid phenol-aldehyde condensation product intercondensed with a partial amide of a polycarboxylic acid containing at lease one —COOH radical and at least one —$CONH_2$ radical.

7. The method as in claim 6 wherein the partial amide is oxamic acid.

8. The method as in claim 6 wherein the partial amide is maleamic acid.

9. The method as in claim 6 wherein the partial amide is phthalamic acid.

10. The method of treating aqueous media to remove cations therefrom which comprises percolating such media through a resinous cation-exchange body which is a dehydrated, infusible reaction product of a liquid phenol-aldehyde condensation product intercondensed with a partial amide of a polycarboxylic acid containing at least one —COOH radical and at least one —$CONH_2$ radical, the said partial amide being present in the proportions of more than 0.25 mol and less than 0.8 mol per mol phenol.

11. The method of treating aqueous media to remove cations therefrom which comprises contacting said media with a cation-exchange body which is the infusible reaction product of a mixture of ingredients comprising phenol, an aldehyde and a partial amide of a polycarboxylic acid containing at least one —COOH radical and at least one —$CONH_2$ radical in the proportions of one mol phenol, 0.25 to 0.8 mol partial amide and at least 1.1 mols aldehyde for each mol of phenol and partial amide.

12. The method as in claim 11 wherein the aldehyde is formaldehyde and the partial amide of a polycarboxylic acid is oxamic acid.

13. The method as in claim 11 wherein the aldehyde is formaldehyde and the partial amide of a polycarboxylic acid is maleamic acid.

14. The method as in claim 11 wherein the aldehyde is formaldehyde and the partial amide of a polycarboxylic acid is phthalamic acid.

GAETANO F. D'ALELIO.